Jan. 1, 1929.

F. F. FORSHEE 1,697,175

HOT PLATE

Filed July 17, 1926 2 Sheets-Sheet 1

WITNESSES:
C. J. Weller.
H. M. Biebel

INVENTOR
Frank F. Forshee.
BY
Wesley G. Carr
ATTORNEY

Jan. 1, 1929.
F. F. FORSHEE
1,697,175
HOT PLATE
Filed July 17, 1926 2 Sheets-Sheet 2
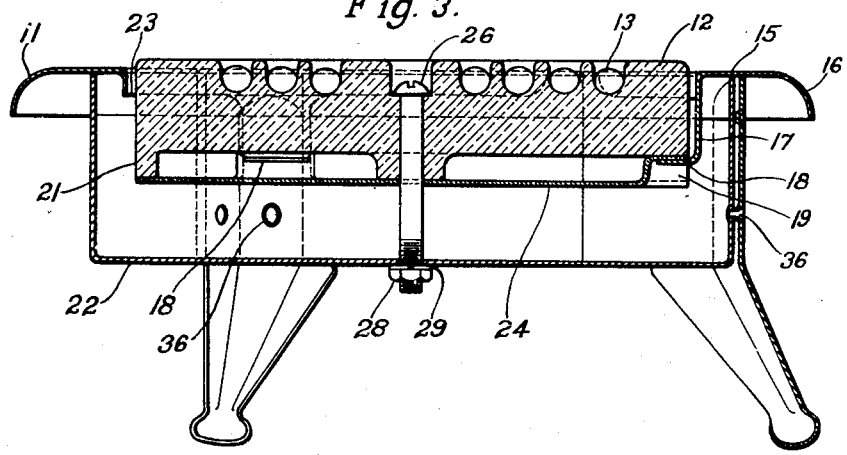
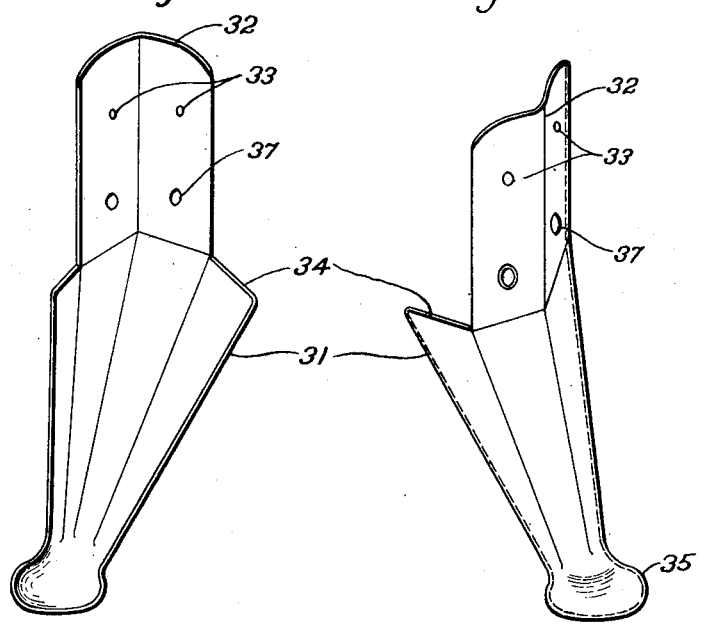
WITNESSES:
INVENTOR
Frank F. Forshee.
BY
ATTORNEY Patented Jan. 1, 1929.

1,697,175

UNITED STATES PATENT OFFICE

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

HOT PLATE.

Application filed July 17, 1926. Serial No. 123,183.

My invention relates to electrically heated devices and particularly to electric hot plates.

An object of my invention is to provide an electrically heated hot plate of relatively simple construction and of relatively low cost that shall consist of but few parts which may be easily and quickly assembled.

Another object of my invention is to provide a novel form of supporting members for a hot plate that shall embody means for reducing the flow of heat thereto.

Another object of my invention is to provide a device, the component parts of which are held together in proper operative positions by a single resilient clamping means.

In practicing my invention, I provide a refractory heating unit, an annular metal frame for directly supporting the heating unit, an open-top casing located beneath the refractory member and the supporting frame and a single means for holding all of these members in proper operative positions relatively to each other.

A plurality of supporting members are provided, the upper portions of which are secured against the outer surface of the casing, these members having projecting portions intermediate their ends located below the bottom surface of the casing.

In the drawings,

Fig. 3 is a view in lateral section therethrough taken on the line III—III of Fig. 1.

Figs. 4 and 5 are front and rear perspective views, respectively, of a supporting member.

Figure 1:
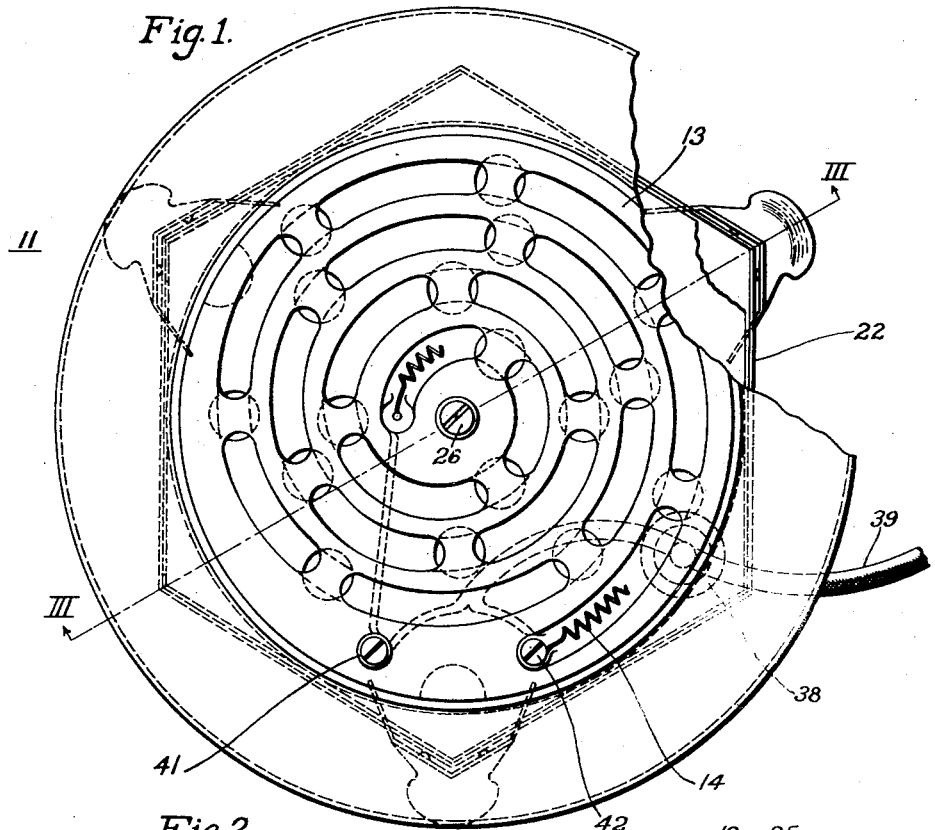
Fig. 1 is a top plan view of a device embodying my invention, a portion thereof being cut away.

An electric hot plate 11 comprises a refractory plate 12, of electric-insulating material having a continuous spiral groove 13 in its upper surface within which is located a helically wound resistor member 14.

An annular metal member 15 is provided which has an outer peripheral flange portion 16 and an inner depending flange portion 17. The flange portion 16 is made of arcuate shape in lateral section in order to provide an annular member having a pleasing appearance.

The depending annular flange 17 is provided with a plurality of inwardly-extending spaced integral projections 18 which are located in recesses 19 provided in the bottom face of the rim portion 21 of the refractory plate 12.

An open-top casing member 22 is provided which is preferably mode of polygonal shape and, as shown in the drawing, may be hexagonal in contour and has its upper rim portion operatively engaging the bottom surface of the annular frame 15. The annular frame member may be provided with an inner depending integral flange portion 23, shown more particularly in Fig. 3 of the drawings, not only to stiffen the annular frame but also to permit of more easily centering the casing 22 relatively to the frame 15.

The casing 22 is made relatively deep in order to reduce the amount of heat transmitted from the bottom of the heating unit which comprises the plate 12 and the resistor 14. An additional means for reducing the flow of heat toward the bottom portion of the casing comprises a plate 24 of a heat-insulating material such as asbestos. This plate is clamped between the plate 12 and the projections 18 of the frame member, to hold it in the position shown. Each side of the polygonal casing 22 is provided with a recess 25 at the upper rim portion, so that the corner portions only of the casing engage the annular frame member.

A single means is provided for holding the refractory plate 12, the annular member 15, and the casing 22 in proper operative positions relatively to each other, this means comprising a bolt 26 extending through an axial opening in the plate 12 and through an alined opening in the bottom of the casing 22, substantially as shown in Fig. 3 of the drawings. A nut 28 and a lock washer 29 are mounted on the outwardly extending end of the bolt 26 whereby the plate 12 may be caused to fit tightly against the projections 18, and the upper rim portion of the casing 22 is caused to closely engage the bottom surface of the annular frame 15, the three members being located substantially in the positions illustrated in Fig. 3 of the drawings. The same means also ensures the clamping of the plate 24 in the position shown.

Figure 2:
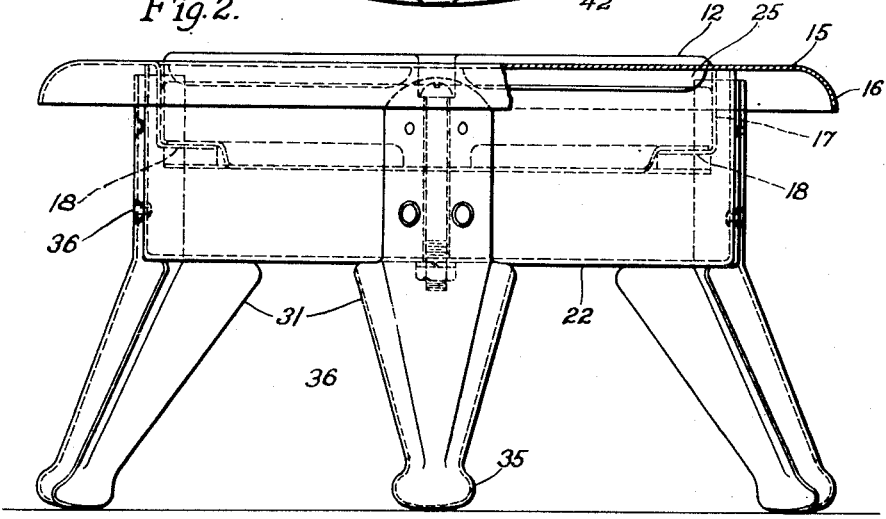
Fig. 2 is a view in side elevation.

A plurality of symmetrically spaced supporting members or legs 31 are provided which are of shaped sheet metal of substantially the form shown in the drawings. Each of these supporting legs comprises an upper portion 32 having two parts so angularly related as to extend substantially parallel to adjacent faces of the polygonal casing 22. Embossed portions 33 are provided in each of the two parts of the portion 33 to effect a spacing of this portion fi m the casing. Shoulder portions 34 are provided on each supporting member intermediate the ends thereof, which shoulder portions are located below the lower surface of the casing 22, as shown more particularly in Fig. 2 of the drawing. The intermediate portion of the respective supporting members is partially polygonal in lateral section, which shape continues until near the bottom end 35 thereof which is made of rounded shape, the main object of such shape being to provide a relatively light and strong construction, while, at the same time, it is of pleasing appearance.

The legs 31 are secured against corner portions of the casing 22 by rivets 36 which extend through openings 37. The metal immediately surrounding the openings 37 is embossed in order to insure that the supporting member will be properly spaced away from the outer surface of the casing 22.

An insulating bushing 38, of refractory material, is provided in the bottom of the casing 22 through which extends a supply-circuit conductor 39 of the kind usually employed with such devices. The inner ends of the two conductors of the cord 39 are connected to the respective ends of the resistor member 14, bolts or screws 41 and 42 extending through spaced openings in the refractory plate 12 to provide the connection therebetween.

It may be noted that the refractory heating plate 12 and the annular frame 15 have interfitting or interlocking portions constituted by the tongue members 18 fitting into the recesses 19, while the plate 12 is spaced from the annular frame member in a radial direction. The amount of heat transmitted from the plate 12 to the annular member will, therefore, be a relatively small quantity only.

The recesses 25 in each of the sides of the casing 22 reduce the area of metal in engagement between the casing and the annular frame, whereby the resistance to heat flow therebetween is increased.

As the screwing or clamping bolt 26 extends through the plate 12 and through the bottom of the casing 22, a resilient clamping means is provided, as the bottom portion of the casing 22 is resilient.

The supporting members will have only a relatively small amount of heat transmitted thereto from the casing because of the small area of engaging contact surface.

The device embodying my invention thus provides a relatively simple hot plate embodying a minimum number of individual members, which members may be easily and quickly assembled and dis-assembled.

Various modifications may be made in the device embodying my invention without departing from the spirit and scope thereof and I desire, therefore, that only such limitations shall be placed thereon as are imposed by the prior art.

I claim as my invention:

1. An electrically heated device comprising a refractory heating unit, an annular supporting frame for the heating unit, a casing for enclosing the lower edge and surface of the heating unit, and a single means extending through said refractory heating unit and casing for holding all of said members in proper operative positions.

2. An electrically heated device comprising an open-top casing, a flat annular metal member resting on the upper rim portion of the casing, a refractory heater plate supported at its rim portion only by the annular metal member, and a single means for resiliently securing all the members in proper operative positions.

3. A hot plate comprising a refractory heater plate having a plurality of recesses in its bottom surface at the rim thereof, an annular metal plate having portions interfitting with said recesses to support the plate and prevent relative turning movement, an open-top casing the rim portion of which operatively engages the annular metal plate, and a single means for resiliently holding the refractory plate, the annular metal plate and the casing in proper operative positions.

In testimony whereof, I have hereunto subscribed my name this first day of July, 1926.

FRANK F. FORSHEE.